(12) United States Patent
Slayton et al.

(10) Patent No.: US 12,260,461 B2
(45) Date of Patent: Mar. 25, 2025

(54) INTERFACE SCREENS FOR USE WITH STRAIGHT THROUGH PROCESSING ("STP")

(71) Applicant: Bank of America Corporation, Charlotte, NC (US)

(72) Inventors: Karen Slayton, St. Johns, FL (US); Lisa J. Decamp, Chicopee, MA (US); Lawren L. Wacha, Jacksonville, FL (US); James M. O'Malley, King of Prussia, PA (US); Angela D. Thompson, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 375 days.

(21) Appl. No.: 17/689,015

(22) Filed: Mar. 8, 2022

(65) Prior Publication Data
US 2023/0289885 A1  Sep. 14, 2023

(51) Int. Cl.
| | |
|---|---|
| *G06Q 40/08* | (2012.01) |
| *G06F 3/0481* | (2022.01) |
| *G06F 9/451* | (2018.01) |
| *G06Q 10/10* | (2023.01) |

(52) U.S. Cl.
CPC .......... *G06Q 40/08* (2013.01); *G06F 3/0481* (2013.01); *G06F 9/451* (2018.02); *G06Q 10/103* (2013.01)

(58) Field of Classification Search
CPC ................................ G06Q 40/08; G06F 9/451
See application file for complete search history.

(56) References Cited

U.S. PATENT DOCUMENTS

| | | | | |
|---|---|---|---|---|
| 8,543,425 | B1* | 9/2013 | Hacker | G06Q 40/08 705/35 |
| 9,923,904 | B1* | 3/2018 | Saylor | G06F 21/10 |
| 9,967,103 | B2* | 5/2018 | Kumar | G06Q 10/103 |
| 11,595,450 | B1* | 2/2023 | Rajendran | H04L 65/4015 |
| 2002/0198743 | A1* | 12/2002 | Ariathurai | G06Q 30/02 705/4 |
| 2008/0255886 | A1* | 10/2008 | Unkefer | G06Q 40/08 705/78 |

(Continued)

*Primary Examiner* — Anil K Bhargava
(74) *Attorney, Agent, or Firm* — Weiss & Arons LLP

(57) ABSTRACT

Apparatus and methods for providing an electronic environment for enabling straight through processing ("STP") of an advisor/client-adopted-illustration are provided. The environment includes a workstation. An interface screen is located on the workstation. The interface screen displays multiple illustrations. The interface screen may distinguish the differences between the two illustrations from like portions of the two illustrations. The interface screen may juxtapose, on the display, like portions of the two illustrations. An environment condition may include a requirement that each of the two illustrations includes a signature from the client. The environment may also include a communications module for transmitting an illustration request to a remote server, which may determine whether an advisor-selected characterization of the illustration is correct. If incorrect, then the remote server may re-characterize the illustration and transmit the re-characterized illustration to the workstation such that the advisor-selected characterization and the recharacterization are displayed together on the interface.

10 Claims, 16 Drawing Sheets

(56) References Cited

U.S. PATENT DOCUMENTS

| | | | |
|---|---|---|---|
| 2016/0042464 A1* | 2/2016 | Dease | G06Q 40/08 |
| | | | 705/4 |
| 2017/0180133 A1* | 6/2017 | Kumar | H04L 9/3297 |
| 2020/0045041 A1* | 2/2020 | Heidari | H04L 63/0861 |
| 2021/0287315 A1* | 9/2021 | Dombeck | G06F 21/31 |
| 2021/0319517 A1* | 10/2021 | Aringdale | G06F 3/0482 |
| 2023/0107602 A1* | 4/2023 | Krasnoff | G06Q 40/08 |
| | | | 705/4 |

* cited by examiner

900

902

Case ID: Insured Name: Contract State: Financial Advisor Name: Case Status: ← Return to Dashboard  Logout
552860  Life Two   North Dakota    FA TEST BUNDY         Pending Order     Carrier:     Death Benefit:
                                                         Entry-Illustrations  ---         ---

Request Illustration   Illustration View   Documents

904 — Internal view only | Client view only

906 — ⓘ FOR INTERNAL USE ONLY, NOT FOR USE WITH CLIENTS.

[Refresh L&A] [Refresh Dashboard] — 910

Non Variable Products

908 — ⓘ Please use the checkbox to the left of any row to view the PDF Illustration on the next page.                🖨 Print Non Variable Summary

| Sl. | Select to View Illustration | Status | Illustration Created Date/Time | Contract State | Solve Type | Carrier Name | Product Name | Product Type ⓘ | Initial Death Benefit | Annual Premium | 1055 |
|---|---|---|---|---|---|---|---|---|---|---|---|
| A | ☐ | Completed | 11/23/2021 12:46:50 | ND | Premium | Lincoln | LifeGuarantee UL (2019)-05/11/20 | UL | $1,000,000 | $15,478.80 | No |

912

914 — ⓘ Summary comparisons made between different life insurance products are not valid unless accompanied by the insurance policy illustration(s)

Variable Products

916 — ⓘ No Variable Products are available.

"You indicated that a trust will own the new policy, has the trust been established?"   ○ Yes  ○ No

[Save] [DeleteCase] [Cancel]                                                                                        [Next]

| Case ID: | Insured Name: | Contract State: | Financial Advisor Name: | Case Status: | Carrier: | Death Benefit: |
|---|---|---|---|---|---|---|
| 559812 | Ebix Test Kerlin | Alaska | FA TEST Bundy-A | Pending FA Action - Formal Offer Deo | Lincoin | $1,500,000 |

Request Illustration  Illustration View  Documents  Formal Requirments  Forms  Decisions  Summary  Tracking

Financial Advisor  Financial Advisor Review Case
Supervision Review
Document Review Team Carrier Officer — 1104

Case Data — 1110

| | Applied For | Offer Request — 1112 | Carrier Offer — 1114 |
|---|---|---|---|
| Death Benefit | $1,500,000.00 | $1,500,000.00 | $1,500,000.00 |
| Annualized Premium | $450,000.00 | $450,000.00 | $422,442.67 |
| Lumpsum Premium | | | |
| 1035 Exchange Premium | | | |

Insured (Miss Ebix Test Kerlin)

| | Applied For | Offer Request | Carrier Offer |
|---|---|---|---|
| Underwriting Class | Standard Non-Tobacco | Standard Non-Tobacco | Preffered Plus |
| Table Rating | None | None | |
| Flat Extra (Amount) | | | |
| Rate Extra (Duration in Years) | | | |
| Policy Effective Date | 01/17/202 | 01/17/2022 | 01/17/2022 |
| Max. Policy Issue Date | 02/28/202 | 02/28/2022 | 02/28/2022 |
| Calculated Insurance Age | 45 | 45 | 45 |
| Backlisted Age | N/A | N/A | N/A |

1100, 1102, 1106, 1108, 1116, 1118

Riders

| | Applied For | Offer Request | Carrier Offer |
|---|---|---|---|
| Rider | ESV | ESV | ESV |

Illustrations

| | Applied For | Offer Request | Carrier Offer |
|---|---|---|---|
| Illustration Document | 📄 Applied For Illustration PDF | 📄 Applied For Illustration Request PDF | 📄 Offer Illustration Request PDF |
| Illustration Request Data | | Applied For Illustration Request | Formal Offer Illustration Request | Offer Illustration Request |

ⓘ By Selecting the 'Accept Offer' button you are agreeing to the offer contingency(ies).

Close Reason
[Select ▽]  [Close case] — 1124

1126 —

Initial Formal Offer

Decision
[Select ▽] — 1128

[Cancel]   [Submit]

INTERFACE SCREENS FOR USE WITH STRAIGHT THROUGH PROCESSING ("STP")

FIELD OF TECHNOLOGY

Aspects of the disclosure relate to straight through processing ("STP") for selected contracts.

BACKGROUND OF THE DISCLOSURE

The invention relates to straight through processing ("STP") for insurance contracts.

Conventionally, presenting insurance policy options to interested parties involves various steps. These steps include requesting and presenting illustrations of possible policy options and offers.

Typically, the steps include requesting and presenting policy illustrations. These policy illustrations may be used to compare products of the same product types. Such legacy requesting and presenting involved third party vendors with Service Level Agreements ("SLAs"). These SLAs allowed the third parties a few days or even up to a week or more to respond to entity requests.

Presentation of policy options and offers is often followed by an informal back and forth between the interested parties and the one or more companies with whom the interested parties are negotiating for a policy. This informal back and forth was also an aspect of legacy policy considerations that increased policy application processing time and effort.

Once a policy has been selected, the interested parties then are guided through a formal process to secure the policy. The formal process typically involves an underwriting step to finalize terms of the relationship between the interested parties and the one or more companies. Once underwriting is complete, the formal process is ready for conclusion. If errors occurred during this aspect of the legacy process, these errors, and correction of same, could also increase time and frustration associated with the legacy process.

Thereafter, the process is finalized at policy issue and then delivered to the client.

As is evident from the foregoing, conventional insurance policy shopping is time- and resource-intensive. Specifically, for a financial advisor offering the policy as part of a financial plan, the process of offering an insurance policy to a client as part of the plan was tedious, and often frustrating, and even possibly embarrassing, due to bottlenecks and complications in the processing. It would be desirable to present to a financial advisor ("FA") an efficient environment (including a system and a process) for straight through processing ("STP") for presenting insurance policies to customers and completing delivery of the insurance policies.

SUMMARY OF THE DISCLOSURE

An electronic environment for enabling straight through processing ("STP") of an advisor/client-adopted-illustration is provided. The environment includes an advisor-located workstation. The environment also includes an interface screen located on the workstation. The interface screen may be configured to display two policy illustrations. The interface screen further configured to juxtapose like portions of each of the two illustrations.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 9 shows an illustrative client view screen of an illustration including high level details in accordance with the principles of the disclosure;

FIG. 11A-11B shows an underwriting offer provided by the carrier in accordance with the principles of the disclosure.

DETAILED DESCRIPTION OF THE DISCLOSURE

Figure 1A:
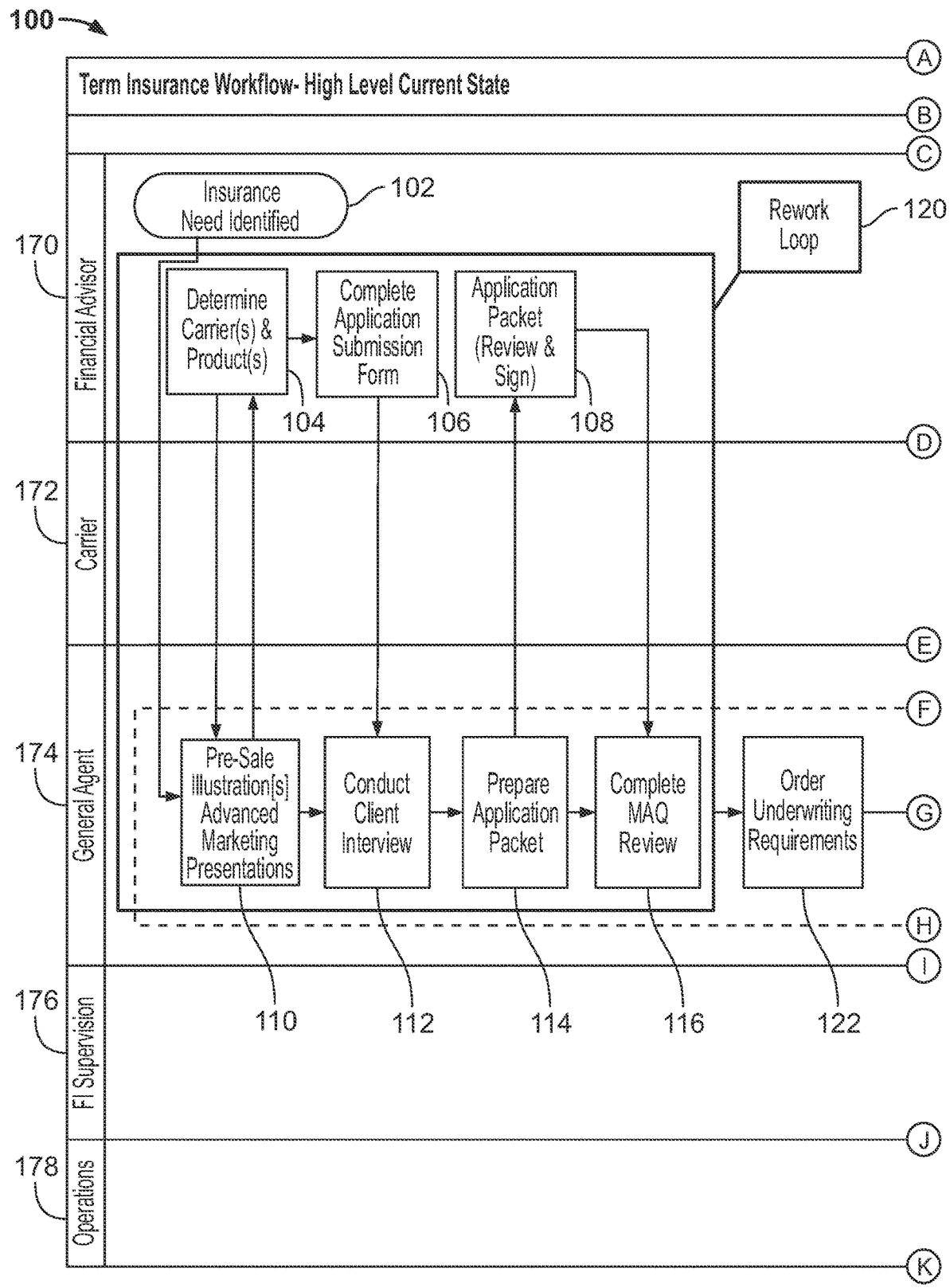
FIGS. 1A-1C shows an illustrative diagram in accordance with prior art processes.

Apparatus and methods for providing an illustration and order entry user interface, which forms part of an overall environment according to the principles of the disclosure, for professionals offering life insurance policies is provided. The apparatus and methods are designed to provide a simplified, consistent and predictable process to run hypothetical life insurance illustrations, submit in good order applications to the life insurance company (the "carrier"), and automatically generate revised illustrations as the sale progresses. The platform preferably covers all relevant aspects of insurance sales processes. These aspects extend from the initial illustration through delivery of the issued contract.

The platform utilizes automated controls and workflow stops in order to ensure adherence to complex procedural, policy and regulatory requirements of the insurance industry. Furthermore, the platform is fully integrated with entity back-office systems to reduce on-site data entry and ensure accuracy. Using mechanisms such as a personal dashboard, financial advisors (FAs) have access to real time status of pending business. This real time status enables greater control and independence throughout the life cycle of insurance sales' processes. Most importantly, the personal FA dashboards incorporate all the operational governance rules, such as business rules and the like, necessary to process and sell the policy and prevent downstream impediments to the process. Such impediments may include downstream obstacles which prevent the process from progressing in a timely fashion, and may require repeated steps and further delays to complete the process.

One example of an operational governance rule of the process is that no hand-written changes to the policy may exist on a wet-signed policy. Accordingly, such a rule governs the operation of the environment and disallows any processing of the policy when it detects a hand-written change to the policy illustration. Such a rule more particularly controls the operation of the screen of the FA in accordance with the principles of the current disclosure.

As such, the screen of the FA preferably cannot run outside the operational governance of the environment.

In another example of an advantage of the environment according to the embodiments, the FA may submit the client as a preferred client and request, and obtain, an illustration for a preferred (risk) application.

At the same time the carrier receives the request and reviews the file. The carrier may initially provide a preferred illustration and, concurrently, determine the insured is a standard (risk) application. As such, the carrier may immediately or soon after providing a preferred illustration provide a standard illustration. It should be noted that there may be substantial differences between the preferred illustration and the standard illustration.

The environment according to the embodiments may support the ability to display a side-by-side showing of a preferred application to a standard application in order to better indicate to an FA the difference between a preferred and a standard illustration.

It should be noted that in both cases—standard and preferred—the illustrations will have to be signed by the client prior to further processing. Because this can happen, according to the disclosure, in substantially the same iteration—i.e., both of the illustrations can be processed substantially simultaneously and presented side-by-side—this reduces time in the policy processing. In legacy systems, running multiple illustrations would take days and require additional input from various parties such as submission to, and receiving a response from, third parties. By eliminating third parties from the process, the environment dispenses with any time delays or SLAs associated with the third parties because, in the environment, the third parties fail to touch the processing of the request for illustrations.

By implementing direct communication—i.e., via straight through processing ("STP")—the FA screen directly from the FA to the illustrations producing software, such as Winflex, the illustrations can be produced substantially in real time, whereas in the past, the process could take from a few days to a week to obtain the same information. In addition, because the business rules for obtaining the illustrations now serve as gatekeeper to processing by the FA screen, any issues with the request (as will be explained below) can be dealt with prior to submission of request for illustrations rather than after such requests are processed. This removes bottlenecks that were in legacy systems. These bottlenecks typically occurred downstream in the legacy process and caused substantial consternation and delay and the FA and the client were forced to retrace steps back to an earlier stage in the process.

For example, when a client orders a permanent life insurance from a certain type of Financial Entity such as a Bank—the client who will own the insurance policy must also have a brokerage account with the bank. Specifically, the ownership name on the insurance policy must match the ownership name on the brokerage account.

Once an FA begins to input the application into the FA screen—the screen may prevent the continuance of the process until it determines that the owner of the prospective policy also is listed as an owner on a brokerage account. This is but one example that can be administered by the environment in a way that can avoid any future delays in the process. This works because the system locks the process prior to resolving the aforementioned critical impediment to the process.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1B:
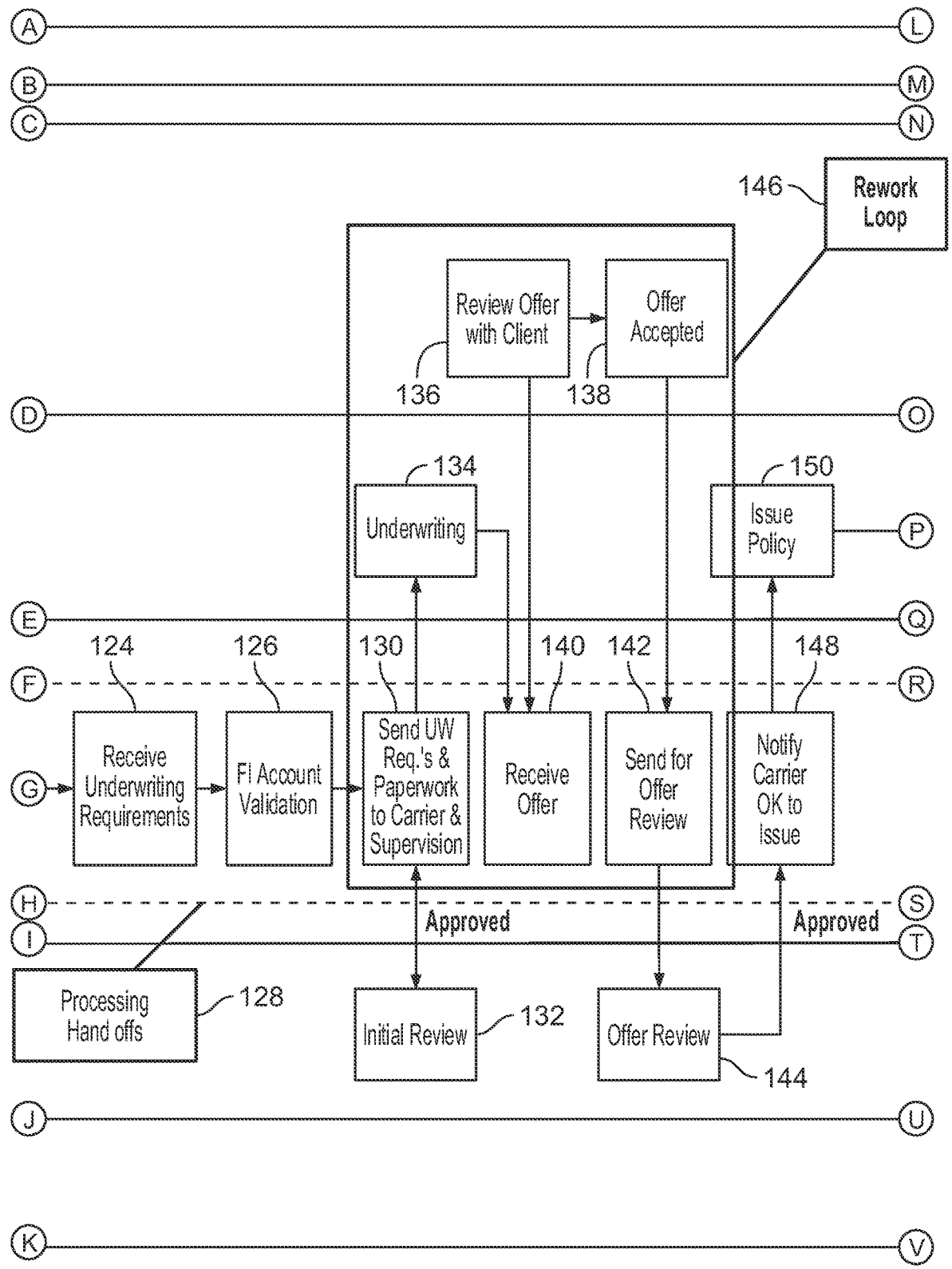
Figure 1C:
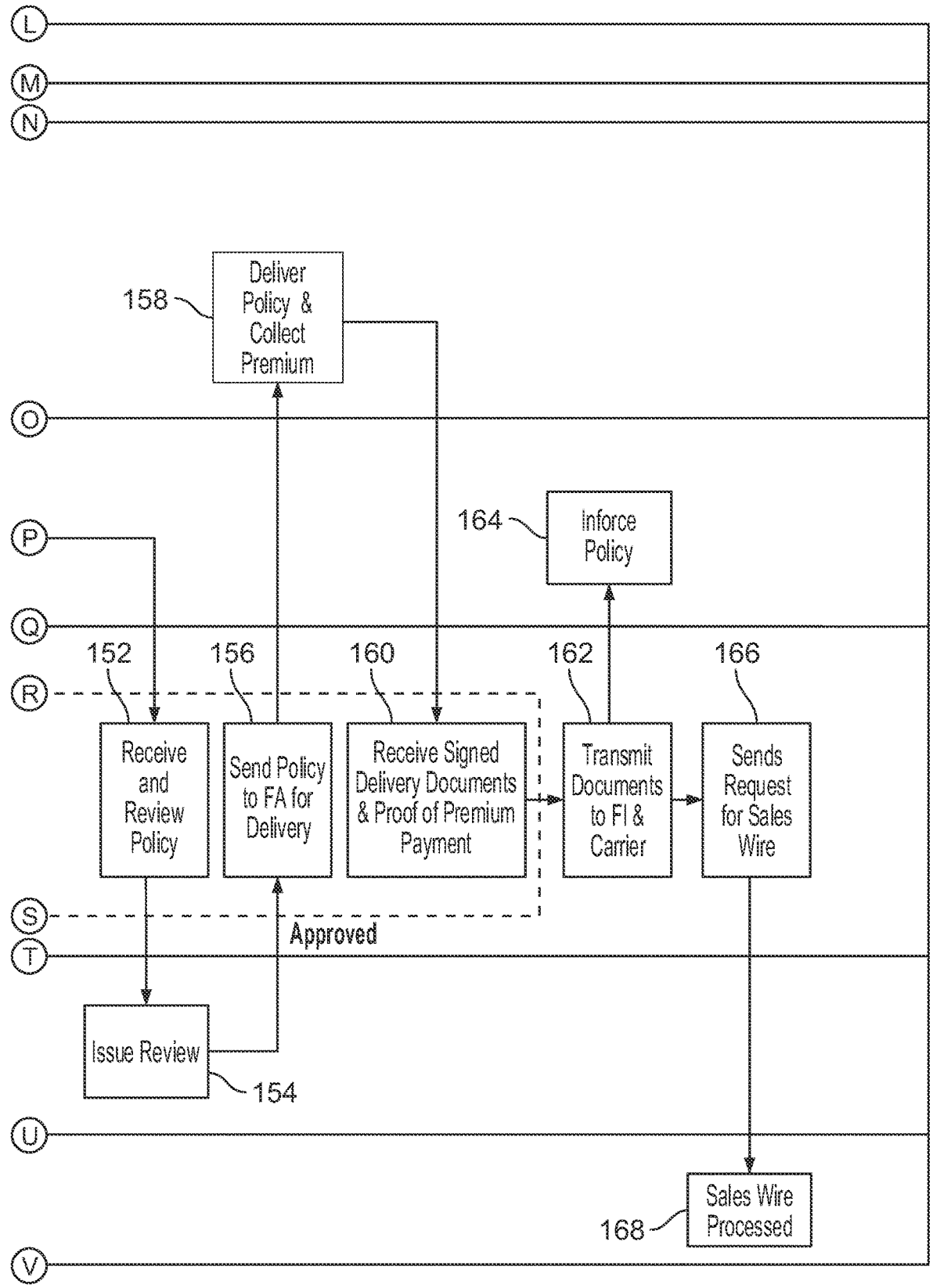

FIGS. 1A-1C shows an illustrative diagram in accordance with conventional processes.

FIGS. 1A-1C shows a permanent insurance workflow. This represents a high-level illustration of the conventional state of an FA offering a permanent insurance policy to a client.

In FIG. 1A, at step 102, an insurance need is identified by an FA, as indicated by swim lane 170. It should be noted that other swim lanes indicate as follows: carrier at 172, general agent at 174, financial institution ("FI") supervision at 176 and operations at 178.

This insurance need is typically associated with permanent insurance.

At step 104—an insurance carrier and/or insurance product may be manually determined. Thereafter, or together therewith, at step 110, a pre-sale term quote may be determined.

Once a quote is determined for a selected carrier and/or product—an application submission form may be complete—as shown at step 106. A client interview may be conducted by the FA or other suitable persona at step 112, followed by a preparation of an application packet at step 114. The application packet may be reviewed and signed as shown at step 108. This may be followed by a minimum acceptable quality ("MAQ") review, as shown at step 116. In FIG. 1A the loop 120 of elements 104-116 may be reworked as necessary prior to handing off to the order underwriting requirements set forth at 122.

In FIG. 1B, at step 124, receiving underwriting requirements is shown. Once underwriting requirements are received, the financial institution ("FI") validates the account, as shown at 126. Such transfers between different entities or sub-entities are considered processing handoffs, 128, and are shown as under the domain of the FI supervision swim lane 176. In practice, these conventional processing steps often involve substantial delays.

Thereafter, the general agent ("GA")—who liasons on such policies between the FA and the carrier and the FI, may send the underwriting requirements and associated paperwork to the carrier as shown at 130. The carrier may perform underwriting at 134 and the GA may receive the offer for the policy at 140.

Following receipt of the offer—the FA may review the offer with the client at 136 and the client may accept the offer at 138. The accepted offer may be sent for offer review at 142.

It should be noted that the FI may perform an initial offer review at 132, and a more final offer review at 144. Following the final offer review at 144, the GA may notify the carrier, at 148, that the policy has been finally reviewed and is fit for issuance. At 150, the carrier may issue the policy. In certain embodiments, the loop from underwriting 130 through final offer review 144 may preferably be reworked as necessary to validate the offer and/or to terminate the offer if the parties fail to come to terms, as shown at 146. However, legacy reworking also may involve multiple rounds of client/FA communications as well as involve multiple signatures on nearly duplicative sets of documents. Such multiple rounds may increase client discontent with the life insurance application process in particular and the financial plan as a whole.

In FIG. 1C, the conventional process continues with receipt and review of the policy by the general agent—as shown at 152. Receipt and review of the policy 152 is followed by an issue review performed by the carrier 154. Once issuance is approved, the general agent sends the policy to the FA for delivery, at step 156. At step 158, the FA delivers the policy and sends the signed delivery documents along with proof of premium to the general agent, as shown at step 160. Again, these multiple handoffs may slow the process and reduce efficiencies.

The general agent then transmits the documents to the FI and carrier, as shown at 162, and the policy is in force, as shown at 164. A request for a sales wire by the general agent is shown at 166 and the sales wire is processed by operations at 168. A sales wire typically includes a commission on procurement of the policy and is sent to the general agent.

As FIGS. 1A-1C indicate, the current state of processing applications for life insurance is very time- and resource-intensive.

Figure 2:
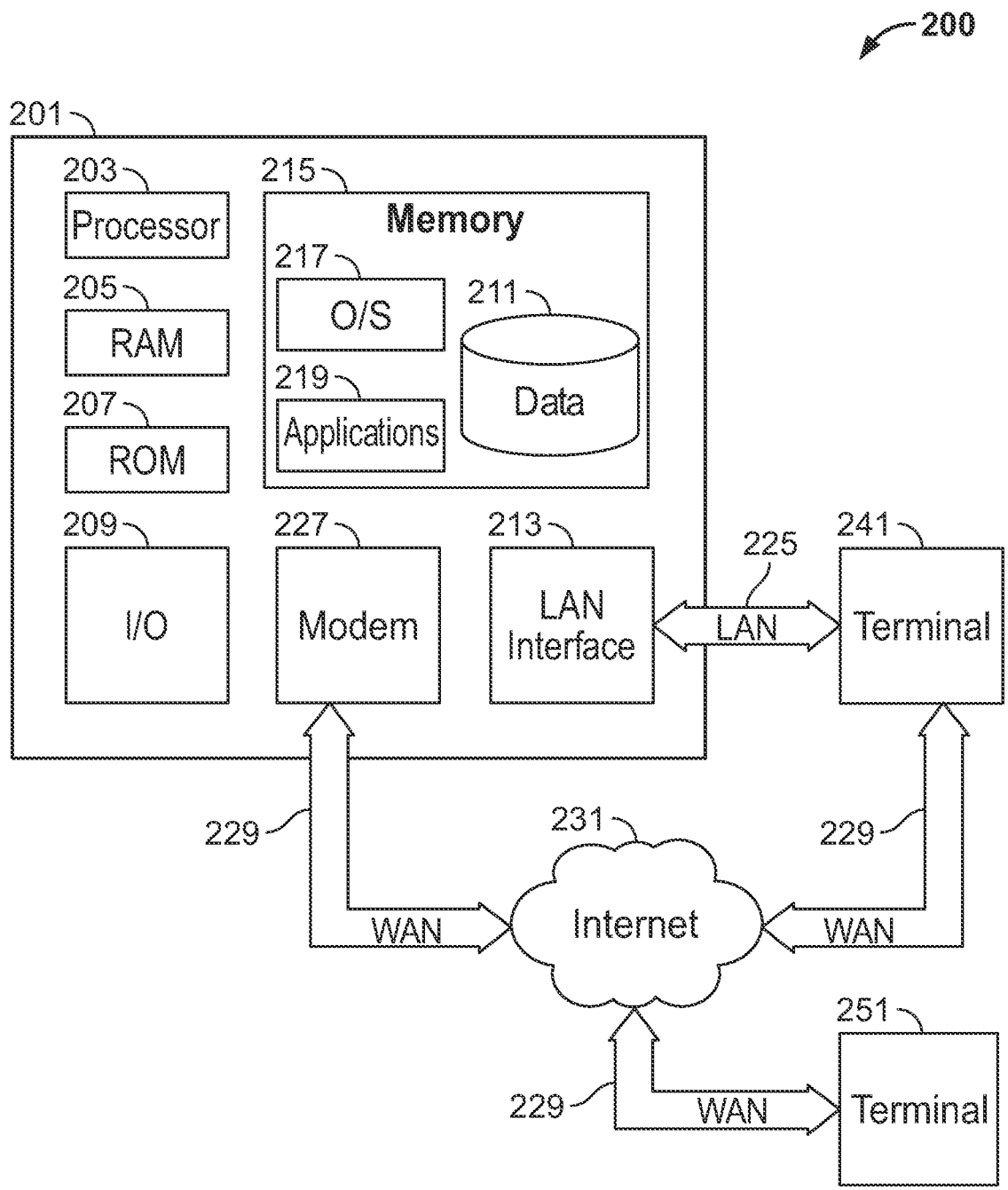
FIG. 2 shows an illustrative block diagram of system that may be configured in accordance with the principles of the disclosure.

FIG. 2 shows an illustrative block diagram of system 200 that includes computer 201. Computer 201 may alternatively be referred to herein as an "engine," "server" or a "computing device." Computer 201 may be a workstation, desktop, laptop, tablet, smartphone, or any other suitable computing device. Elements of system 200, including computer 201, may be used to implement various aspects of the systems and methods disclosed herein. Each of the systems, methods and algorithms illustrated below in FIGS. 4-8 may include some or all of the elements and apparatus of system 200.

Computer 201 may have a processor 203 for controlling the operation of the device and its associated components, and may include RAM 205, ROM 207, input/output ("I/O") 209, and a non-transitory or non-volatile memory 215. Machine-readable memory may be configured to store information in machine-readable data structures. The processor 203 may also execute all software running on the computer. Other components commonly used for computers, such as EEPROM or Flash memory or any other suitable components, may also be part of the computer 201.

The memory 215 may be comprised of any suitable permanent storage technology—e.g., a hard drive. The memory 215 may store software including the operating system 217 and application program(s) 219 along with any data 211 needed for the operation of the system 200. Memory 215 may also store videos, text, and/or audio assistance files. The data stored in memory 215 may also be stored in cache memory, or any other suitable memory.

I/O module 209 may include connectivity to a microphone, keyboard, touch screen, mouse, and/or stylus through which input may be provided into computer 201. The input may include input relating to cursor movement. The input/output module may also include one or more speakers for providing audio output and a video display device for providing textual, audio, audiovisual, and/or graphical output. The input and output may be related to computer application functionality.

System 200 may be connected to other systems via a local area network (LAN) interface 213. System 200 may operate in a networked environment supporting connections to one or more remote computers, such as terminals 241 and 251. Terminals 241 and 251 may be personal computers or servers that include many or all of the elements described above relative to system 200. The network connections depicted in FIG. 2 include a local area network (LAN) 225 and a wide area network (WAN) 229 but may also include other networks. When used in a LAN networking environment, computer 201 is connected to LAN 225 through LAN interface 213 or an adapter. When used in a WAN networking environment, computer 201 may include a modem 227 or other means for establishing communications over WAN 229, such as Internet 231.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 219, which may be used by computer 201, may include computer executable instructions for invoking functionality related to communication, such as e-mail, Short Message Service (SMS), and voice input and speech recognition applications. Application program(s) 219 (which may be alternatively referred to herein as "plugins," "applications," or "apps") may include computer executable instructions for invoking functionality related to performing various tasks. Application program(s) 219 may utilize one or more algorithms that process received executable instructions, perform power management routines or other suitable tasks. Application program(s) 219 may utilize one or more decisioning processes for the processing of calls received from calling sources as detailed herein.

Application program(s) 219 may include computer executable instructions (alternatively referred to as "programs"). The computer executable instructions may be embodied in hardware or firmware (not shown). The computer 201 may execute the instructions embodied by the application program(s) 219 to perform various functions.

Application program(s) 219 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 211, and any other suitable information, may be stored in memory 215.

The invention may be described in the context of computer-executable instructions, such as application(s) 219, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 201 and/or terminals 241 and 251 may also include various other components, such as a battery, speaker, and/or antennas (not shown). Components of computer system 201 may be linked by a system bus, wirelessly or by other suitable interconnections. Components of computer system 201 may be present on one or more circuit boards. In some embodiments, the components may be integrated into a single chip. The chip may be silicon-based.

Terminal 241 and/or terminal 251 may be portable devices such as a laptop, cell phone, tablet, smartphone, or any other computing system for receiving, storing, transmitting and/or displaying relevant information. Terminal 241 and/or terminal 251 may be one or more user devices. Terminals 241 and 2513 may be identical to system 200 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 3:
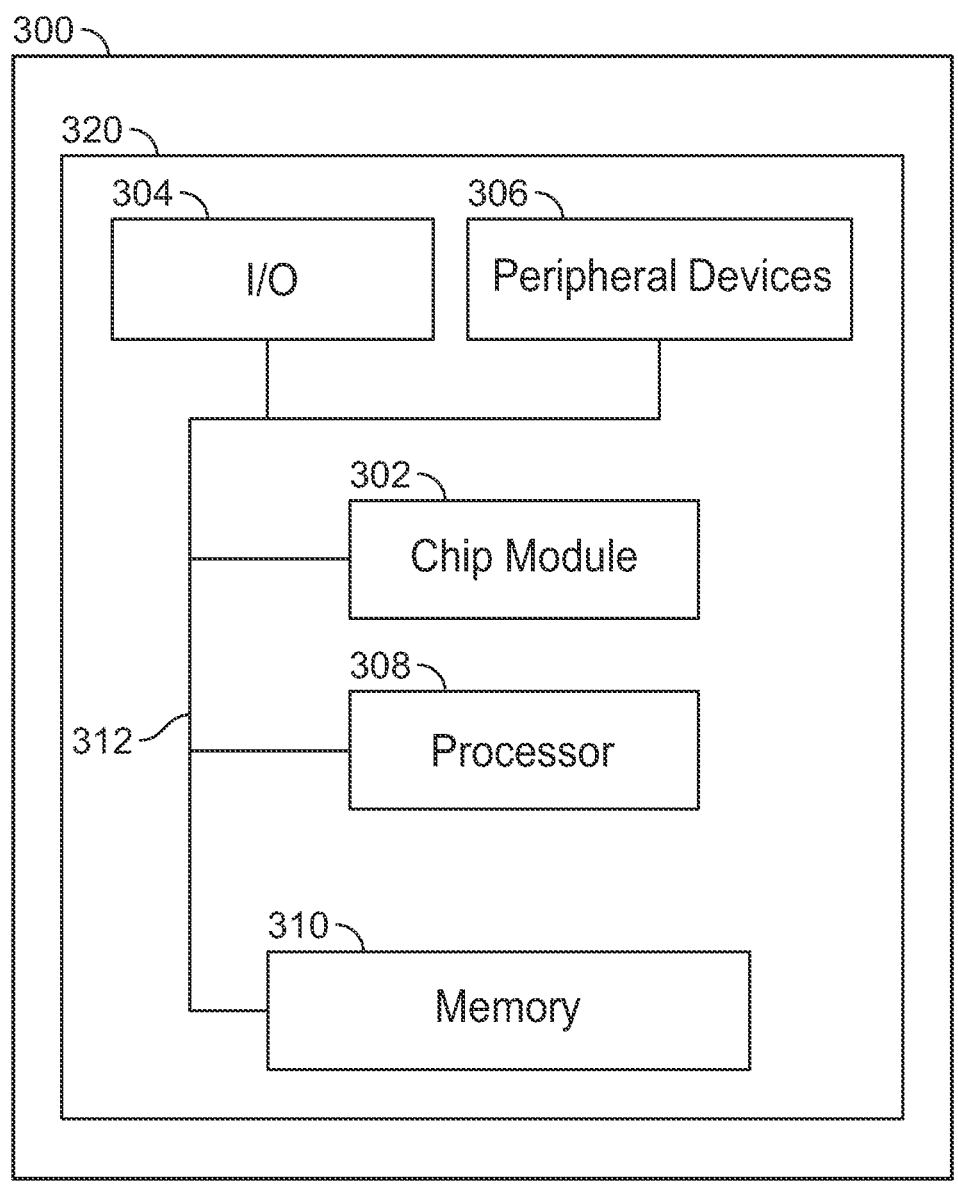
FIG. 3 shows illustrative apparatus that may be configured in accordance with the principles of the disclosure.

FIG. 3 shows illustrative apparatus 300 that may be configured in accordance with the principles of the disclosure. Apparatus 300 may be a computing device. Apparatus 300 may include one or more features of the apparatus shown in FIG. 2. Apparatus 300 may include chip module 302, which may include one or more integrated circuits, and which may include logic configured to perform any other suitable logical operations.

Apparatus 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable media or devices; peripheral devices 306, which may include counter timers, real-time timers, power-on reset generators or any other suitable peripheral devices; logical processing device 308, which may compute data structural information and structural parameters of the data; and machine-readable memory 310.

Machine-readable memory 310 may be configured to store in machine-readable data structures: machine executable instructions, (which may be alternatively referred to herein as "computer instructions" or "computer code"), applications such as applications 219, signals, and/or any other suitable information or data structures.

Components 302, 304, 306, 308 and 310 may be coupled together by a system bus or other interconnections 312 and may be present on one or more circuit boards such as circuit board 320. In some embodiments, the components may be integrated into a single chip. The chip may be silicon-based.

Figure 4:
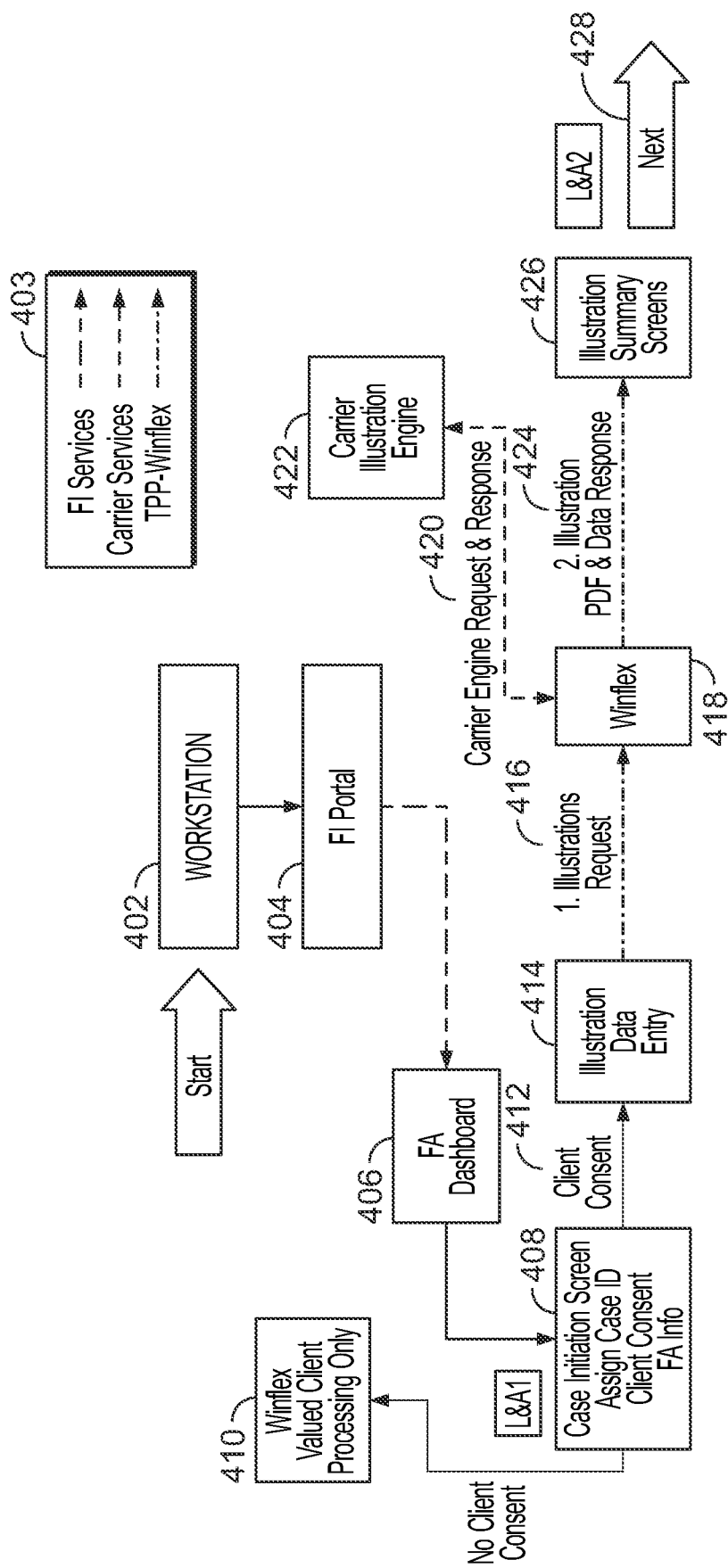
FIG. 4 shows a high-level overview of requirements for using conventional platforms to provide illustrations according to the principles of the disclosure.

FIG. 4 shows a high-level overview of requirements for using conventional platforms, such as Winflex™, manufactured by Ebix, Inc., of John's Creek, Georgia, to obtain one or more insurance policy illustrations. Such illustrations may be provided pursuant to requests from an FA and/or other suitable specialists. Upon the provision of multiple illustrations of the same product type, a comparison can be drawn and provided through, for example, a side-by-side display.

The overview initiates at a client engagement workstation at 402 (for use by an FA), and continues to an FI portal at 404. The portal may preferably be accessed through a SAFI SSO (SAFI single sign-on) using an FA dashboard, as shown at 406. FA dashboard 406 may preferably show a case initiation screen that enables an FA to assign a case ID, prompt for client consent and display the FA information, as shown at 408. It should be noted that the key to identifying the interconnecting lines between the steps of the process is shown at 403 (as well as 503 in FIG. 5, 603 in FIG. 6, 703 in FIGS. 7 and 803 in FIG. 8).

A case initiation screen may assign a case ID number, may request client consent and may receive, or pre-populate, FA information, as shown at step 418. Absent client consent, the system may further conduct the process, as shown at step 410, but preferably only for a threshold level of processing, such as a valued client.

When client consent 412 is provided, an illustration data entry is provided at 414. A Policy Processor ("TPP")-illustration request 416 is sent to Winflex, at 418, which, in turn dispatches a carrier engine request, preferably requesting a response 420, to carrier illustration engine 422. For the purposes of this application, TPP refers to a single solution designed to help carriers build rich, interactive and intelligent electronic applications for agents/advisors, consumers and call center operations. Winflex includes interfaces that allow users to run multiple carrier illustrations while only requiring them to learn a single input system. Winflex may also provide side-by-side comparisons of multiple carriers/products.

Winflex preferably leverages an illustration PDF or other suitable illustrative document 424 together with a response to the data request included in the carrier engine request 420 to provide illustration summary screens 426. At 428, an indication is provided that transitions from the summary of requirements to a high-level summary of requirements for informal processing. This concludes the high-level overview of the summary of requirements for providing illustrations.

Figure 5:
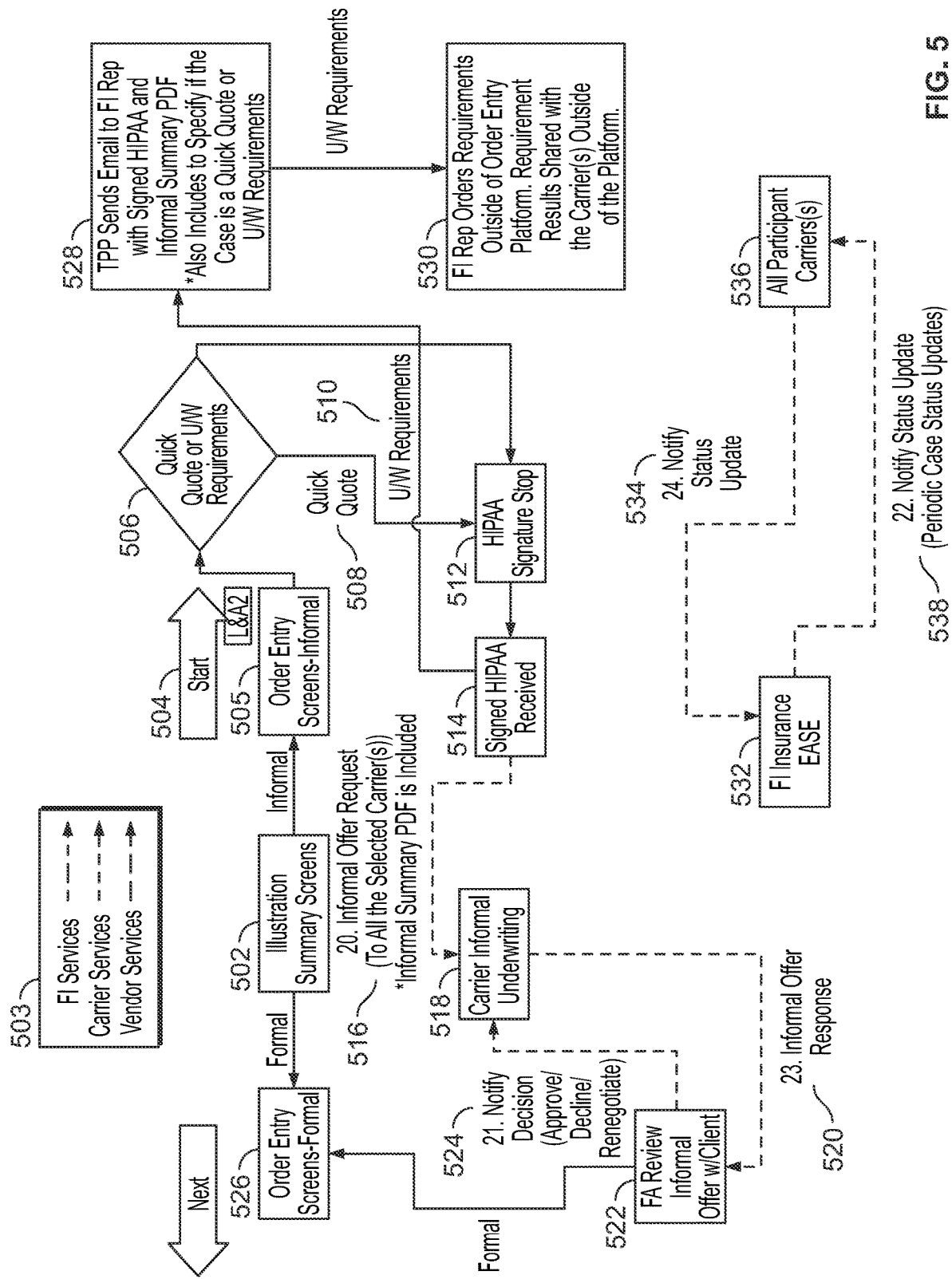
FIG. 5 shows a high-level summary of requirements for informal processing in accordance with the principles of the disclosure.

FIG. 5 shows a high-level summary of requirements for informal processing. The process starts at 504. Illustration summary screens are provided at 502. At step 505, informal order entry screens are provided.

A query requesting a quick quote or underwriting ("U/W") requirements is shown at 506. Along either path, a Health Insurance Portability and Accountability Act ("HIPAA") signature stop, that precludes further progress in the process, is shown at 512. Once a signed statement authorizing release of medical information is received, as shown at 514, the process may continue.

At 528, the TPP may send an electronic transmission such as, for example, an e-mail, with the signed release and an informal summary PDF document. This transmission may also include a flag which indicates whether the current transmission is a quick quote or a response to U/W requirements. At 530, an FI representative may order requirements outside of the order entry platform. In such circumstances, the requirement results may preferably be shared with the carrier(s) outside of the platform.

Along the second path—i.e., the path involving the quick quote 508, an informal offer request is sent to the carrier at 516. The informal offer request may be sent to all the selected carriers and may include an informal summary PDF.

Following the informal offer request transmission at 516, the carrier informal underwriting may take place at 518. An informal offer response at 520 may be sent for an informal FA review of the offer with the potential client at 522. A notification of a decision to approve/decline or renegotiate the informal offer is shown at 524.

To the extent the informal offer is approved for formalization, the FA or GA may be presented with a formal order entry screen at 526.

A periodic status update notification loop between the participant carriers and the FI insurance electronic applications support environment ("EASE") is shown at 534 and 538. At 532, the FI insurance EASE is shown and at 536 all participant carriers are shown.

In short, FIG. 5 shows an FA selecting an illustration and lead carrier to move forward with an informal application. Onscreen messaging may be leveraged to encourage a transition to a more formal application. An FA typically selects between providing a quick quote or meeting underwriting requirements. Typically, if the FA selects underwriting requirements, then the FA may share the results of the underwriting requirements received from the prospective insured with preferably all the relevant carriers. In certain embodiments, the TPP may share minimal case and illustration data with the selected carriers along with a proposed lead carrier. Following the foregoing, the FA may review the offers from the carriers and select an illustration to move forward with for the formal application. The TPP may notify the selected carrier, as well as the other carriers, with the decision.

Figure 6:
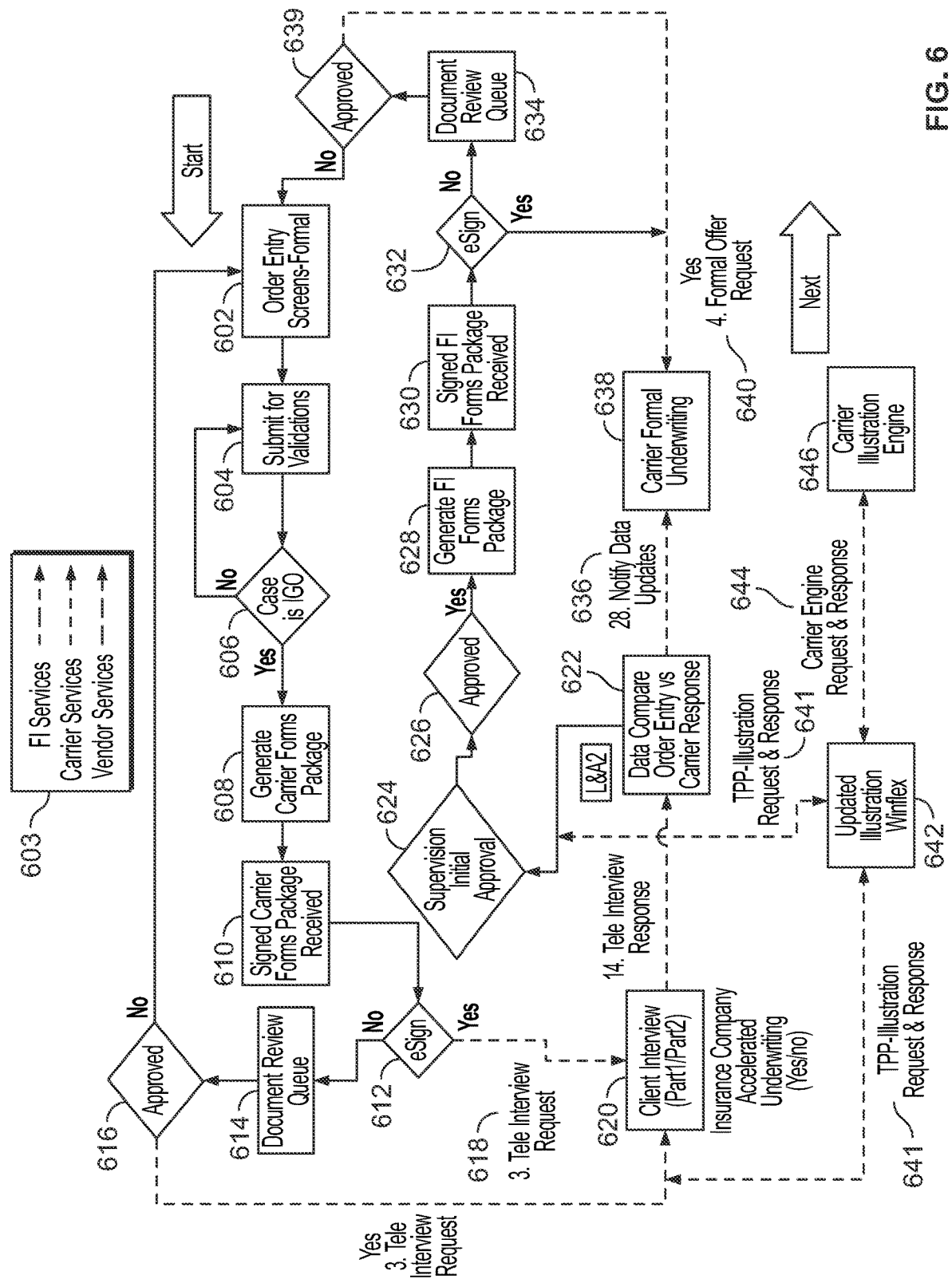
FIG. 6 shows a high-level summary of the formal process up to underwriting the offer in accordance with the principles of the disclosure.

FIG. 6 shows a high-level summary of the formal process up to underwriting the offer. At 602, the formal entry screens are presented. At 604, formal information may be submitted for validation. The process queries, at 606, whether the case is not in good order ("IGO")—at which point it loops back to tweaking the case and resubmitting for validations—or the case is IGO—and the carrier generates a carrier forms package, as shown at 608.

At step 610, a signed carrier forms package is shown as generated and received. The system queries whether an electronic signature application ("eSign") is being used for obtaining the prospective client's signatures. If the package is not prepared for electronic signatures, then the signed package is placed in the document review queue, as shown at 614. The system then queries whether the documents for client signature have been approved, as shown at step 616. If the documents are not approved, then the documents are returned to formal order entry screens 602.

If the documents are approved, then the documents are submitted with a request for a tele-interview, as shown at 618. The client interview is indicated at 620. At this point, the case may be flagged as qualifying, or not qualifying, for accelerated underwriting. It should be noted that, when eSign is leveraged to speed the process, the system may traverse immediately to the client interview at 620.

Following the interview, the data from the order entry is compared, at step 622, to the carrier response.

Pursuant to a favorable comparison at 622, two approval branches of the process may be followed. Notification of any data updates may be received at 636, and carrier formal underwriting may be undertaken, at 638.

It should be noted that insurance company applications usually include two parts. Each of these two parts may be completed at separate times and sometimes by different teams. Part 1 (referred to in the alternative as Part A) typically includes the nonmedical questions. Part 2 (referred to in the alternative as Part B) typically includes the medical questions.

In addition, it should be noted that there may also be two separate client interviews.

The first interview may include questions relating to part 1 (or A) of the application.

The second interview may include questions relating to part 2 (or B) of the application. The questions relating to part 2 may, under certain circumstances, be asked by the paramedical examiner as part of the examination.

Branch 624-634 may operate as follows. The comparison 622 may continue to a supervision initial approval at 624 and 626, which will, in turn, generate an FI forms package, at 628. The signed FI forms package, at 630, may be sent for signature using eSign, at 632, which, upon receipt of electronic signature, advances the process to formal underwriting at 638. Absent electronic signature, the FI forms package may be sent through document review queue 634 and, when approved at 639, may also proceed to carrier formal underwriting, at 638. If the documents are not approved at 639, then the process may return to formal entry screens, at 602.

It should be noted that the environment preferably provides updated illustration via Winflex, as shown at 642, and injects these updated illustrations into the process at the locations shown in FIG. 6. These updated illustrations may be injected into the process via policy-processor illustration requests and responses, as shown at 641. Furthermore, updated illustration(s) via Winflex may be derived based on communications 644 with carrier illustration engine(s) as shown at 646.

To summarize the disclosure of FIG. 6, the TPP generates the forms package and receives the signed one. The TPP then sends a tele-interview request which includes specific order entry data and signed package material. Thereafter, the carrier provides the tele-interview response with data collected portion of the tele-interview. The TPP may present the data differences to the FA. The FA may review the data differences and finalize the data to be retained on the case. To this end, a comparison of the FI data and the carrier data may be implemented. The FI account data may be obtained from back-office systems and should be preferably correspond to the entered data. If there are discrepancies, the FA should preferably correct back-office system and re-initiate the account call. At that point, the TPP may notify the carrier of the data update. Upon completion of the formal underwriting, the process may continue to the policy issue request sent to the carrier, as shown in detail in FIG. 7.

Figure 7:
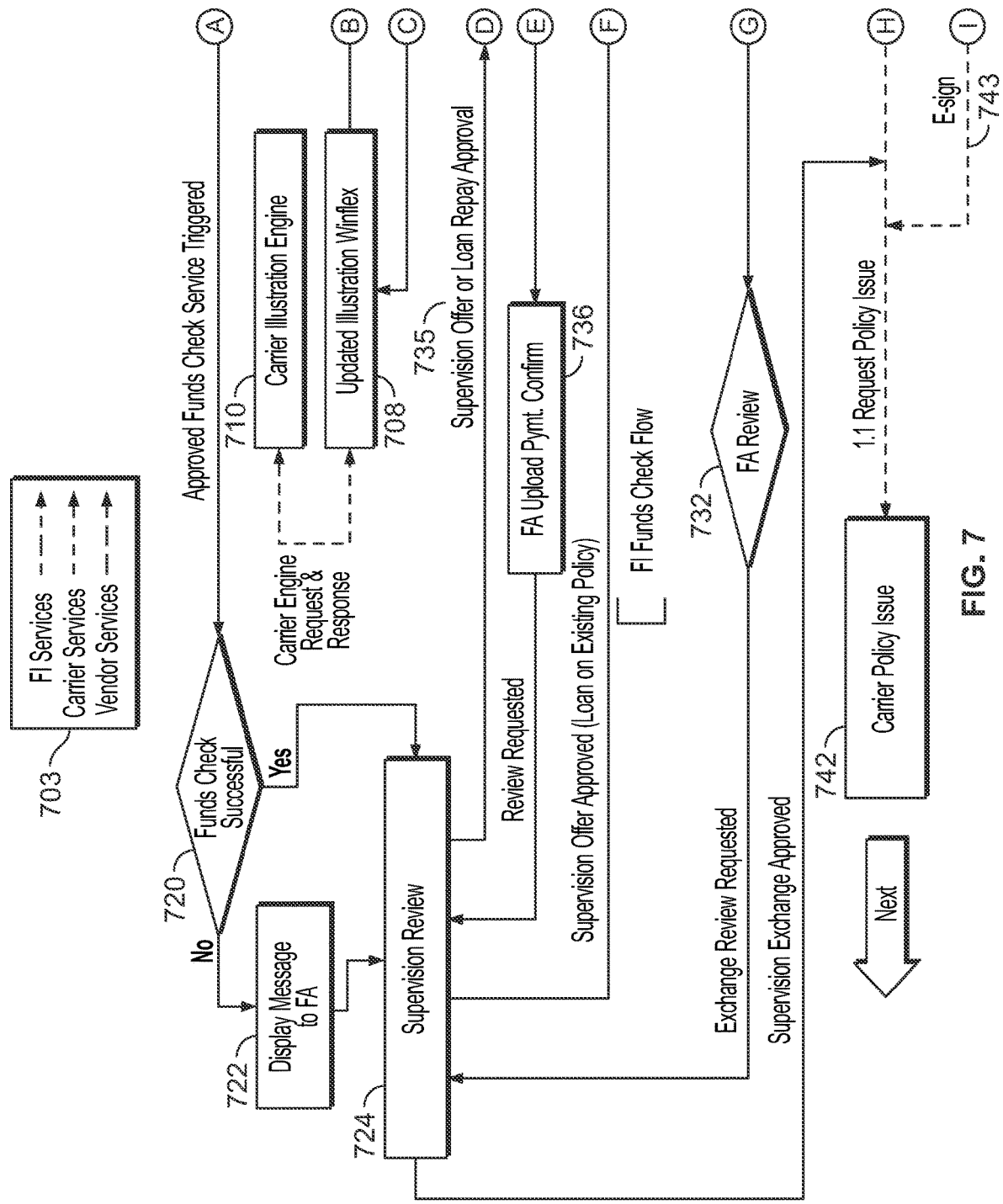
FIG. 7 shows the transition from completion of formal underwriting to the sending of the policy issue request to the carrier in accordance with the principles of the disclosure.
Figure 7:
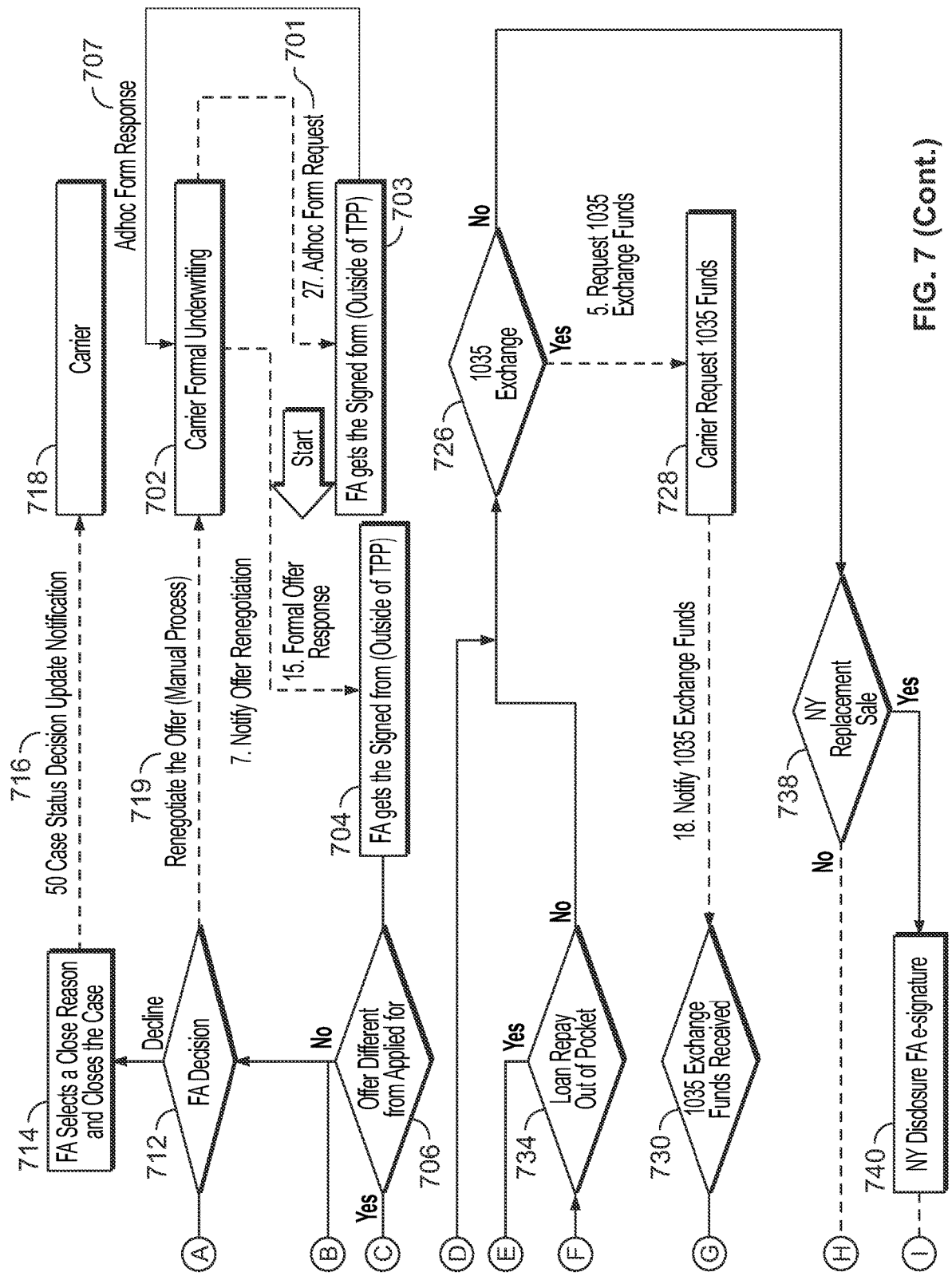

FIG. 7 shows the transition from completion of formal underwriting to the sending of the policy issue request to the carrier. At 720, the system queries whether the approved check service was triggered in a successful manner. If not, then the failure of the approved funds check is displayed as a message to the FA at 722. This notification on the screen of the FA then gets sent for supervision review, at 724. If the funds check is successful, this, too, is sent for supervision review at 724.

Supervision review may also approve an offer for a loan on an existing policy, as needed. A request for an exchange of one policy for another may be transmitted from the FA review for supervision review, as shown at 724. The supervision review may approve the exchange and send a request for the policy to issue to the carrier, as shown at 742. Such a new policy may require a client-side e-Sign as shown at 743.

An alternate path to triggering an approved funds check is shown at the denial of step 712. This path derives from an updated Winflex illustration, shown at 708, which may be derived through a carrier engine request and response derived from the carrier illustration engine 710. At this point, the FA has declined to advance the policy, and, at 714, the FA selects a close reason and closes the case. At 716, the system sends a case status decision update notification to the carrier 718.

In some embodiments, the FA may initiate an attempt to manually renegotiate the offer 713 with the carrier formal underwriting, as shown at 702. Further to the renegotiation, carrier formal underwriting 702 may send an ad hoc form request 701 to the FA 705 and may receive the ad hoc form 707 response from the FA. Thereafter, the carrier may send the formal offer response which the FA may get signed outside of the policy processor, as shown at 704.

If the offer is the same as previously, then the offer will be transmitted to the FA for a decision, as shown at 712. If the offer is different from the previous offer, then the offer may be transmitted for an updated Winflex illustration as shown at 708.

If a supervision offer or a loan repayment is occurring, as shown at 735, then this may involve a 1035 exchange. A 1035 exchange is a provision in the United States tax code which allows a policyholder to transfer funds from a life insurance, endowment or annuity to a new policy, without having to pay taxes.

At 734, determination is made if the loan on the policy being exchanged is being repaid out of pocket. If the loan is being repaid out of pocket, then the upload payment confirmation may be sent and confirmed by the FA at 736. When an FA uploads a payment confirmation, at 736, a review of same may be requested and sent for supervision review, at 724.

If the loan on the policy is being exchanged and is not being repaid out of pocket—this may become part of the terms of the 1035 exchange. If the 1035 exchange is acceptable, and the repayment funds are not being paid out of pocket—the carrier is requested to process an exchange of 1035 funds between the policies, as shown at 728. When the carrier processes the exchange of 1035 funds, a notification of the 1035 exchange of funds is sent, and a 1035 exchange of funds received is indicated at 730. The exchange is then sent for FA review at 732 and, in turn, sent for supervision review at 724.

If the 1035 exchange does not occur, then a New York replacement sale, shown at 738, is also an option. Pursuant to such a sale, the NY disclosure FA 743 e-signature may be required, as shown at 740 and, thereafter, the carrier may be contacted to request a carrier policy issue 742.

As mentioned above, FIG. 7 shows the transition from completion of formal underwriting to the sending of the policy issue request to the carrier. In summary, FIG. 7 shows the carrier sending an offer or request for an ad hoc form—and the FA is presented with the offer. The FA can either approve the offer or request a renegotiation. If the data changes require a new case creation, then the FA may close the case with a specific close reasons and notify the carrier of the closure. In some embodiments, the policy processor may request an updated illustration with the offer data. If the policy purchase involves a 1035 exchange, then the policy processor may send a 1035 funds request to the carrier, where required. The policy processor may also generate an illustration matching the 1035 funds. In certain embodiments—the FA may trigger an offer renegotiation request. Upon supervision approval, the TPP may initiate the next steps in the process flow.

Figure 8:
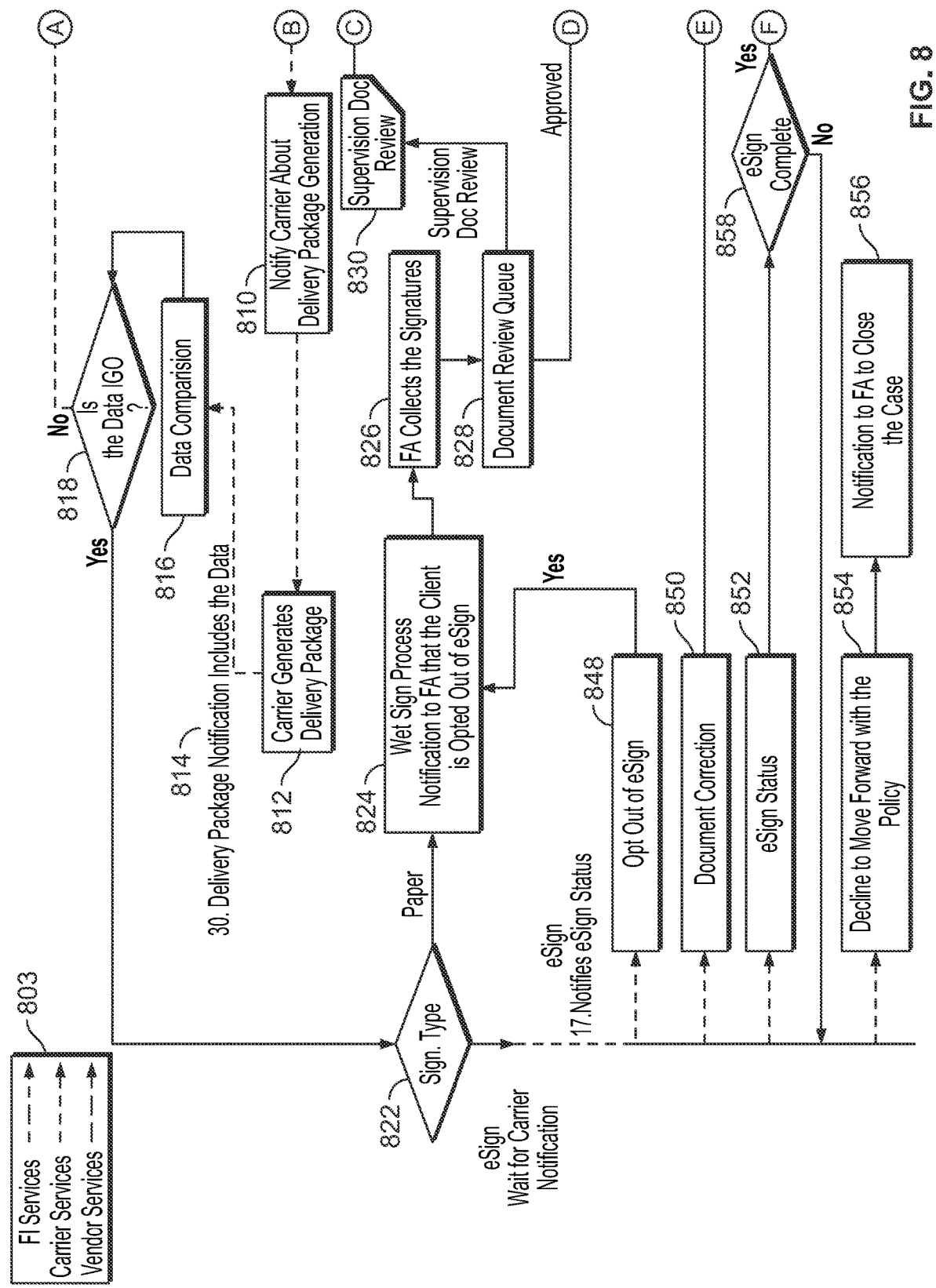
FIG. 8 shows high level requirements for policy issue through policy delivery in accordance with the principles of the disclosure.
Figure 8:
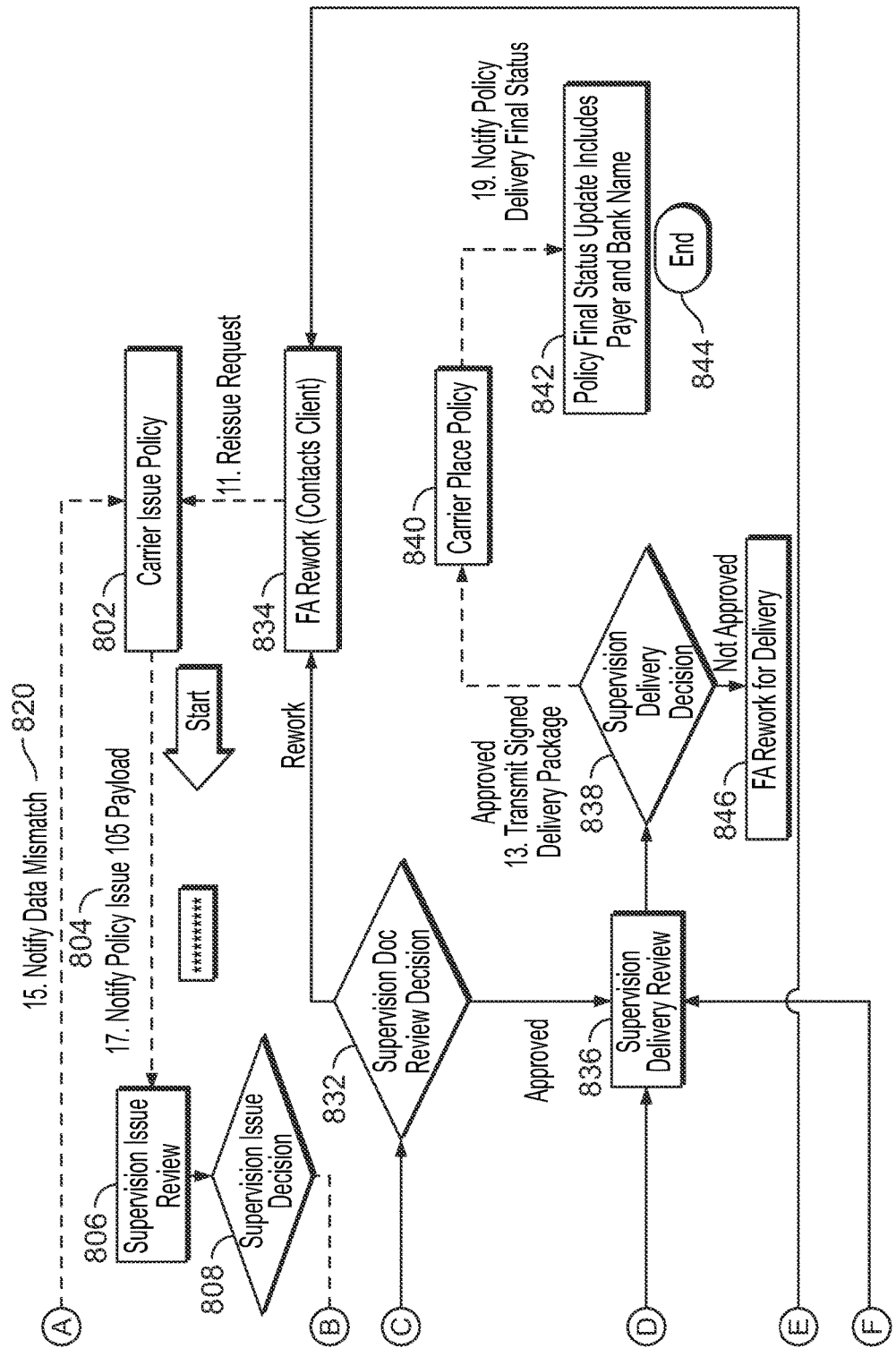

FIG. 8 shows high level requirements for policy issue through policy delivery. At 802, the carrier issues the policy. A notification of the policy issue—including a payload with the policy attached—is sent for supervision issue review, as shown at 806. The supervision issue decision is shown at 808. At the start of this process, as shown at 810, the carrier is notified about the policy delivery package generation. Thereafter, at 812, the carrier generates the delivery package. The delivery package includes the data for the policy, as shown at 814, and, following data comparison at 816, the data is queried to determined whether the data is in good order ("IGO"), at 818. If the data is not IGO, then it is rerouted to the carrier issuing the policy to notify the carrier of the data mismatch 820. If the data is IGO, then the sign type is determined at 822.

When a notification of eSign status is received from the carrier, the client has the ability to opt out of eSign 848 and returning to the paper signature process at 824. Process 824 may include a wet sign process notification to the FA that the client has opted out of the eSign procedure. At that point, the FA may collect the signatures, as shown at 826, and proceed to the document review queue, at 828. The supervision document review follows at 830, which, in turn, is followed by the supervision document review decision, at 832.

Failure to pass the supervision document review decision may generate a rework order, at 834, by the FA. Such a rework may involve contacting the client for final approval and resubmission to the carrier.

Approval at the supervision document review generates a supervision delivery review 836. Thereafter, a supervision delivery decision is made at 838. When the delivery is approved, the carrier places the policy, at 840, and the policy final status update notification is sent, at 842. The policy final status update notification may include the payer and the bank name. Thereafter, the process ends, as shown at 844. If the supervision document review disapproves the policy at 838, then the policy may be reworked by the FA for delivery, as shown at 846.

Prior to eSigning, any document correction may be sent, as shown at 850, for reworking by the FA at 834. Notification of the eSign status may be sent at 852 to the eSign complete query 858. When the eSign is complete, the process may transition to supervision delivery review, at 836. If, for some reason, the eSign is not completed, the process continues through 854 and 856. Steps 854 and 856 indicate that the client has declined to move forward with the policy and a notification is sent to the FA to close out the case, respectively.

In summary, FIG. 8 shows that the carrier issues the policy and sends the delivery package and data to the policy processor. The policy processor compares the order entry data with the data received. If the data is in IGO then the case is sent for supervision issue review. If the data is not IGO, then a notification is sent back to the carrier about the data mismatch. When the data is IGO, the policy processor sends a notification to the carrier to initiate the eSign process to collect the signatures on the delivery forms.

Once policy processor receives a signature complete status, the policy processor sends the case to supervision delivery review. When the policy processor module receives notification from the carrier that client has opted out of eSignature then the policy processor switches the flow to a wet (non-electronic) signature. If the signature type is wet signature, then the FA collects the signatures from all the clients.

Once the FI supervision review is complete, the policy processor notifies the carrier about the signed delivery package. Delivery documents may then be uploaded to the policy processor and transmitted to carrier. A premium may then be collected and provided to the carrier outside of the order entry platform. The carrier may then send the final status to the policy processor along with the payor and bank name. Typically, money settlement is no longer day 1.

FIG. 9 is an illustrative client view screen of an illustration including high level details in accordance with the principles of the disclosure. The high level details of illustration 900 include case identification information 902, screen tabs 904 and screen identifier 906. Identification information 902 may include case ID, insured's name, contract state, FA name, case status, carrier and death benefit. Screen tabs 904 may include internal view only, external view only, or some combination of internal view and external view (not shown).

Policy illustration information is listed at 912 and includes status, creation time, contract state, solve type, carrier name, product name, product type, initial death benefit, annual premium and § 1035 status.

Notation 914 indicates that summary comparisons between different life insurance products should be performed, and indeed are not valid unless performed, unless accompanied by the life insurance illustration. Notation 916 indicates whether variable products are available that meet input life insurance needs.

Figure 10:
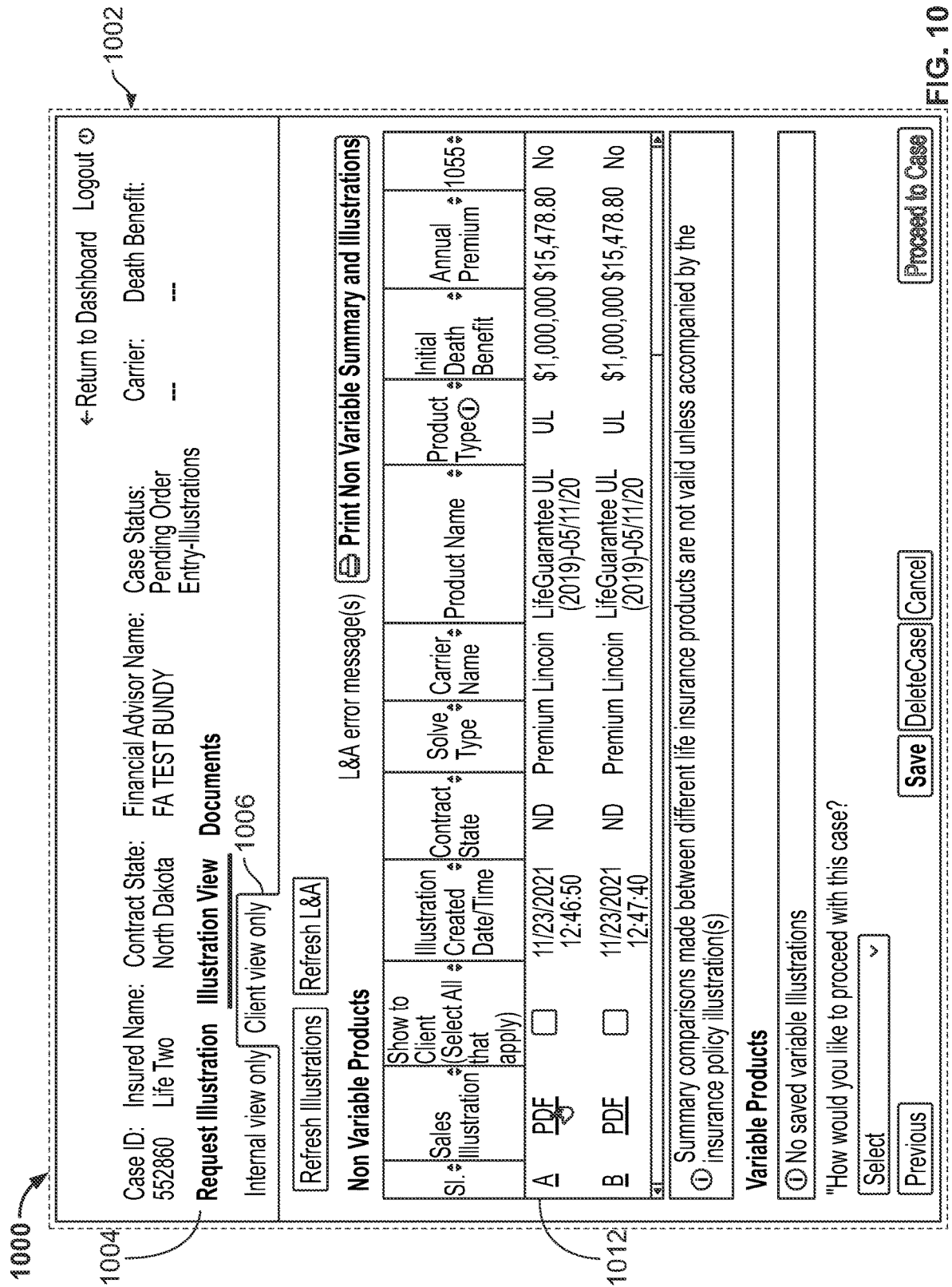
FIG. 10 shows an illustrative internal view screen of an illustration including high level details in accordance with the principles of the disclosure.

FIG. 10 is an illustrative internal view screen 1000 of an illustration comparison including high level details in accordance with the principles of the disclosure. Case identification information is shown at 1002, screen tabs are shown at 1004, screen identifier is shown 1006, and the actual illustration of two illustrations plus high level details is shown at 1012.

FIG. 11A-11B is an underwriting offer provided by the carrier in accordance with the principles of the disclosure. Case identification information is shown at 1102. Screen tabs are shown at 1104. Screen identifier is shown at 1106. Case data is shown at 1108. Case data preferably includes multiple columns such as applied for information 1110, offer request 1112, and carrier offer 1114.

Insured data is shown at 1116, and includes table 1118. Table 1118 may include various insured information such as underwriting classification, table rating, policy effective data, max policy issue date, calculated insurance age and backdated age.

FIG. 11B may show rider information at 1120, illustration documentation at 1122, close reason button 1124, close reason drop-down menu at 1126, and initial former offer field at 1128.

Thus, a platform and methods for providing straight through processing of insurance policy and delivery are provided. Persons skilled in the art will appreciate that the present invention can be practiced by other than the described embodiments, which are presented for purposes of illustration rather than of limitation. The present invention is limited only by the claims that follow.

What is claimed is:

1. An electronic environment for enabling straight through processing ("STP") of an advisor/client-adopted illustration, the electronic environment comprising:
   a platform including:
      a workstation associated with an advisor, the workstation being integrated with back-office systems operated by an entity, the advisor being associated with the entity; and
      a single interactive interface display screen located on the workstation, said single interactive interface display screen displaying a personal dashboard associated with a client, the personal dashboard including automated controls configured to incorporate operational governance rules relating to advisor/client adopted illustrations, the personal dashboard configured to:
         enable the advisor to access real time status of pending transaction processing relating to the client; and
         display a first illustration and a second illustration, said single interactive interface display screen further configured to juxtapose like portions of the first and second illustrations; and
   a remote server;
   wherein:
      the back-office systems are configured to update the personal dashboard based on real time changes in the pending transaction processing relating to the client;
      the automated controls are configured to lock the single interactive interface display screen when the client fails to satisfy at least one pre-determined environment condition;
      the at least one pre-determined environment condition comprises a requirement that each of the first and second illustrations comprises a signature from the client; and
      the remote server is configured to determine whether an advisor-selected characterization of the first illustration is correct and, if the advisor-selected characterization of the first illustration is incorrect, then the remote server is configured to recharacterize the first illustration as a second illustration and transmit the second illustration to the workstation such that the advisor-selected characterization of the first illustration and the recharacterization of the first illustration comprise the first and second illustrations displayed on the single interactive interface display screen.

2. The electronic environment of claim 1, wherein the automated controls are configured to unlock the single interactive interface display screen when each of the first and second illustrations comprises a signature from the client.

3. The electronic environment of claim 1, wherein the at least one pre-determined environment condition comprises a requirement that the client is named as an owner on a pre-determined account within the entity associated with the advisor.

4. The electronic environment of claim 1, wherein the electronic environment further comprises a communications module for transmitting an illustration request to the remote server.

5. The electronic environment of claim 4, wherein the communications module is further configured to receive the first and second illustrations from the remote server.

6. A method for enabling straight through processing ("STP") of an advisor/client-adopted-illustration, the method comprising:

displaying a personal dashboard on a single interactive display screen, the single interactive display screen located on a workstation, the workstation being associated with an advisor, the workstation being integrated with back-office systems operated by an entity, the advisor being associated with the entity, the personal dashboard being associated with a client, the personal dashboard including automated controls configured to incorporate operational governance rules relating to advisor/client adopted illustrations, the personal dashboard configured to enable the advisor to access real time status of pending transaction processing relating to the client;

juxtaposing like portions of a first illustration and a second illustration; and updating the first illustration and the second illustration via a remote server; wherein:

the back-office systems are configured to update the personal dashboard based on real time changes in the pending transaction processing relating to the client;

the automated controls are configured to lock the single interactive display screen when the client fails to satisfy at least one pre-determined environment condition;

the at least one pre-determined environment condition comprises a requirement that each of the first and second illustrations comprises a signature from the client; and the remote server is configured to determine whether an advisor-selected characterization of the first illustration is correct and, if the advisor-selected characterization of the first illustration is incorrect, then the remote server is configured to recharacterize the first illustration as a second illustration and transmit the second illustration to the workstation such that the advisor-selected characterization of the first illustration and the recharacterization of the first illustration comprise the first and second illustrations displayed on the single interactive display screen.

7. The method of claim 6, wherein the automated controls are configured to unlock the single interactive display screen when each of the first and second illustrations comprises a signature from the client.

8. The method of claim 6, wherein the at least one pre-determined environment condition comprises a requirement that the client is named as an owner on a pre-determined account within the entity associated with the advisor.

9. The method of claim 6, wherein the method further involves a communications module for transmitting an illustration request to the remote server.

10. The method of claim 9, wherein the communications module is further configured to receive the first and second illustrations from the remote server.

* * * * *